United States Patent [19]

McConnell et al.

[11] 4,091,004
[45] May 23, 1978

[54] TRIAZINE DYES REACTIVE THROUGH THEIR PHOSPHORUS ACID GROUPS

[75] Inventors: Bobby Lee McConnell, Greensboro, N.C.; Raymond Thornton, Lake Placid, N.Y.; Louis Atkins Graham, Greensboro, N.C.

[73] Assignee: Burlington Industries, Inc., Greensboro, N.C.

[21] Appl. No.: 710,152

[22] Filed: Jul. 30, 1976

[51] Int. Cl.² .................. C09B 62/00; C09B 62/44; D06P 1/384; D06P 3/66
[52] U.S. Cl. .................. 260/153; 260/146 T; 544/187
[58] Field of Search ............... 260/153, 146 T, 249.6; 544/187

[56] References Cited

U.S. PATENT DOCUMENTS

| 1,667,312 | 4/1928 | Fritsche et al. | 260/153 |
| 2,200,543 | 5/1940 | Dickey et al. | 260/205 |
| 2,493,975 | 1/1950 | Kaiser | 260/153 |
| 3,065,191 | 11/1962 | Heslop et al. | 260/153 |
| 3,259,618 | 7/1966 | Andrew | 260/146 T |

Primary Examiner—Floyd D. Higel
Attorney, Agent, or Firm—Cushman, Darby & Cushman

[57] ABSTRACT

A novel class of dyes are disclosed of the formula:

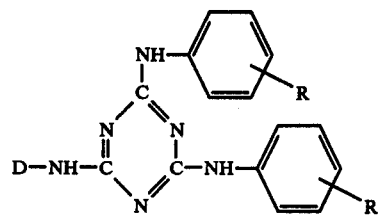

where D represents a chromophore and R represents a phosphonic or a phosphoric group. These acid groups serve both as water-solubilizing and as reactive groups to bond the dyes covalently to cellulosic substrates.

10 Claims, No Drawings

TRIAZINE DYES REACTIVE THROUGH THEIR PHOSPHORUS ACID GROUPS

BACKGROUND OF THE INVENTION

This application relates to new dyes and to dyeing of fibers, more particularly, to new phosphorus acid dyes which in use become covalently linked through a condensation residue to sites on the fiber.

The novel class of dyes here disclosed is characterized by a chromophore attached to a triazine ring. As starting materials, a large class of such materials having two halogen atoms attached to the triazine ring are already known, as discussed below. Such dyes are reacted with two moles of an aminophenyl phosphonic or phosphoric acid of the type described to produce the novel dyes of the invention. These are represented by the formula:

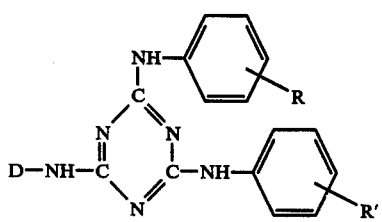

where D represents a chromophore and each of R and R' is preferably either

(preferably in the meta position) or

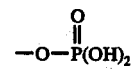

(preferably in the para position with respect to the amino group). R is preferably the same as R'. Less preferably, one of R and R' may be

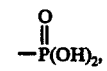

and the other

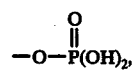

or the total of R and R' may be composed of varying proportions of

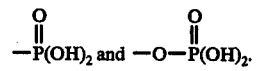

The exact structure of the chromophore is not critical and may derive from a wide variety of dye structures. These latter, when combined with dihalotriazine radicals, constitute what are known conventionally as reactive dyes. Illustrative reactive dyes used as starting materials include:

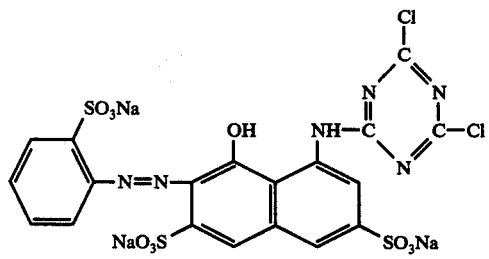
CI Reactive Red 1
(CI 18158)

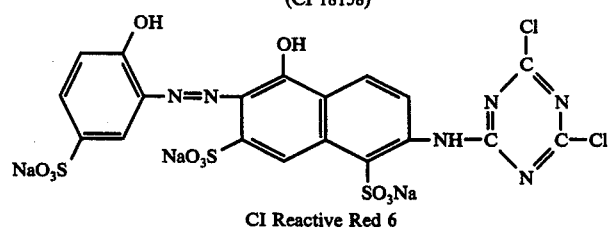
CI Reactive Red 6
(CI 17965)

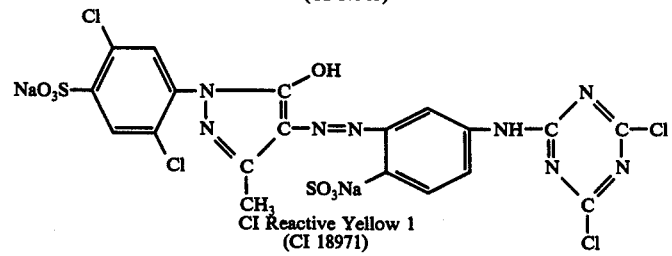
CI Reactive Yellow 1
(CI 18971)

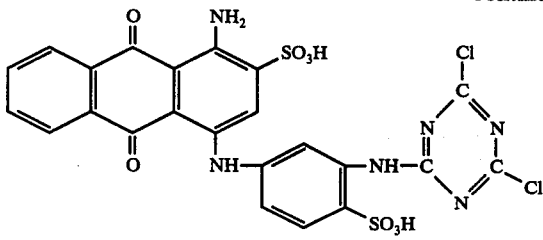

CI Reactive Blue 4
(CI 61205)

Other suitable starting dyes will be apparent to one skilled in the art.

The dyes of the invention have the particular advantage that they start from a wide variety of conventional reactive dyes of known shades. By incorporation of aminophenyl phosphonic and/or phosphoric radicals, one may, at will, develop a new line of dyes having generally predictable shades, without significant color shift. The dyes of the invention are, furthermore, highly superior in their hydrolytic and storage stability, compared with the instability and other handicaps of the conventional halotriazine dyes.

These novel dyes are particularly useful in that they can be chemically bound to cellulosic and other fibers and exhibit excellent color fixation. They become covalently linked to cellulose fibers by means of a phosphorus ester link produced in the presence of a carbodiimide, such as cyanamide. Such procedures are described in detail in German Offen. Publication No. 25 05 497 of Aug. 14, 1975, the disclosure of which is hereby incorporated by reference.

The following examples describe illustrative procedures used to synthesize the novel dyes here disclosed and describe their use in the dyeing of cotton fabric.

EXAMPLE I

To 5 g CI Reactive Red 1 dissolved in 100 ml water was added 1 g p-aminophenyl phosphoric acid with stirring. The pH was adjusted to 6.5 and the mixture then heated at 140° F for 35 minutes. The solution was cooled and then passed through an acid ion exchange column to absorb cations and convert the salt to the free acid dye of the formula:

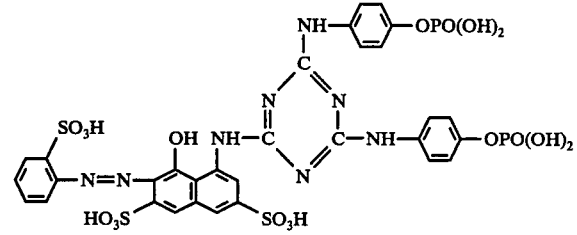

The dye may, if desired, be isolated by evaporating its solution to dryness.

From the foregoing ion-exchanged dye solution, a small dyebath was prepared containing 1% dye, 4% cyanamide, 0.1% nonylphenoxypoly(ethyleneoxy)ethanol (Igepal CO-710) surfactant and 0.5% $H_3PO_4$ (85%). The solution was adjusted to pH 5 with ammonia and padded onto 100% cotton fabric, which was dried at 220° F and then cured for 90 seconds at 390° F. A bright red dyeing resulted. Fixation of the dye, following scouring with soda ash and Synthrapol SP (a mixture of ionic and anionic detergents sold by ICI), was 45%.

The fixations of the dyes herein were determined with the Beckman DBG Spectrophotometer, the color value after the curing oven being taken as 100% and the value after scouring as the measure of the fixed dye.

EXAMPLE II

From CI Reactive Red 6 and in the same manner as Example I, the following dye was prepared:

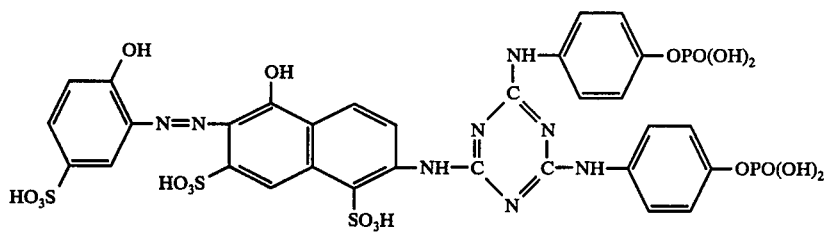

A fixation value of 54% was obtained when the dye was used to dye 100% cotton fabric as in Example I.

EXAMPLE III

From CI Reactive Yellow 1 and m-aminophenylphosphonic acid, in the same proportions and by the same procedure as in Example I (except that the reaction mixture was heated overnight at 100°-120° F), the following dye was prepared:

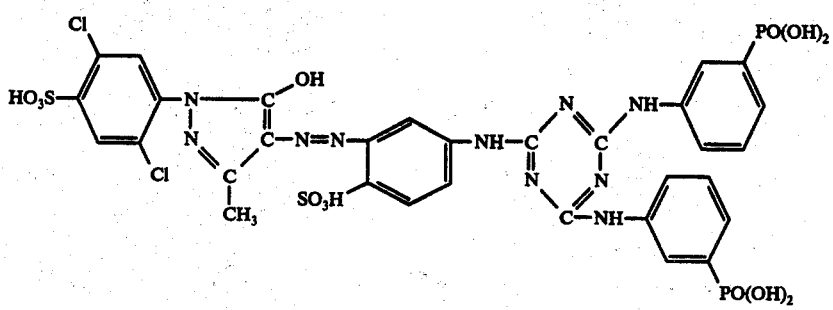

A dyeing of 100% cotton with this dye as in Example I gave a yellow fabric which was scoured and given 5 typical home launderings using Tide detergent. The color loss was assigned a class 4 rating on the gray scale (AATCC).

EXAMPLE IV

From CI Reactive Blue 4 and in the same manner as Example III, the following dye was prepared:

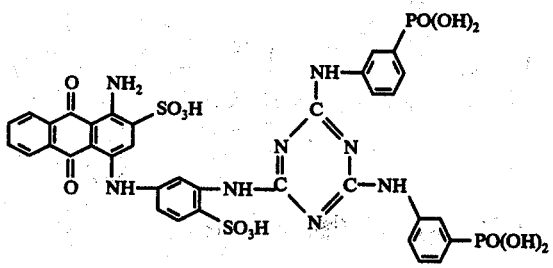

Good color fixation was observed when 100% cotton was treated with this dye by the procedure of Example I.

EXAMPLE V

Also in the manner of Example I, CI Reactive Red 6 was reacted with m-aminophenylphosphonic acid to produce the following dye:

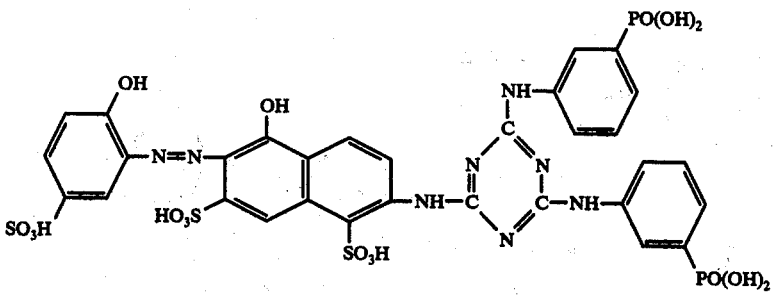

Excellent fixation of the dye was obtained on 100% cotton by the method of Example I.

The dyes of the invention have a number of distinctive advantages, both as a class and as individuals. It has already been noted hereinbefore that they can be derived from a wide variety of conventional reactive dihalotriazine dyes by simple replacement of aminophenyl phosphoric or phosphonic radicals for the active halogen atoms of the starting dyes. This assures a wide range of substantially predictable shades, inasmuch as neither the substituted nor the substituting group is generally likely to have a significant effect on the known color of the starting dye.

The dyes of the invention have the further advantage, compared to conventional reactive dyes which are applied under strongly alkaline conditions, that they mostly are applied under acidic conditions and thus may be applied together with disperse dyes in the same dyebath. Alkaline conditions lead to flocculation of the majority of disperse dyes, which fact drastically limits the possibilities for simultaneous dyeings of polyester and cotton with disperse and conventional reactive dyes. In contrast, the acid fixing conditions used with the dyes of the invention have no adverse effect on disperse dyes, and the two types of dyes can be used together without difficulty.

In the dyes of the invention, the same phosphonic acid group which provides a site for reaction also serves as a strong water-solubilizing group for aiding removal of any dye molecules which are not fixed, thereby helping to insure efficient removal of unfixed dye during process rinsing and to reduce subsequent drawn-out washdown during customer use.

Although formulated herein in their free acid form, the dyes of the invention may also be made and used as their alkali metal or ammonium salts or mixture thereof. They preferably are used in their free-acid, ammonium or acid ammonium salt form, upward adjustment of pH in the dyebath, where needed, being made with ammonia, downward adjustment of pH with hydrochloric acid or other acid volatile under curing conditions.

What is claimed is:

1. A dye of the formula:

5. The dye according to claim 4 of the formula:

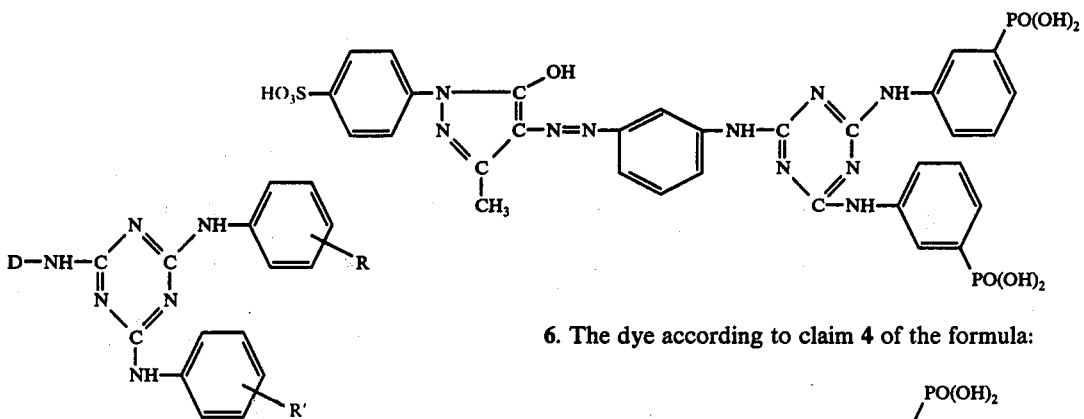

6. The dye according to claim 4 of the formula:

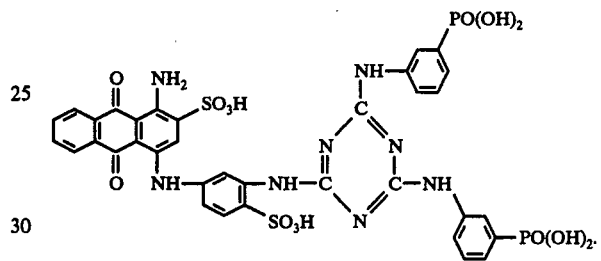

7. The dye according to claim 4 of the formula:

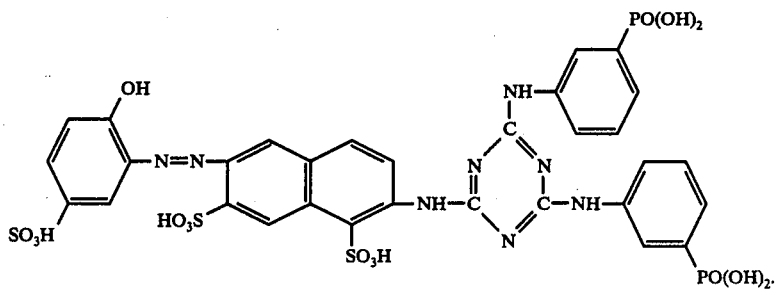

wherein:
D represents chromophore and each of R and R' is in the meta or para position and is defined as a —PO(OH)$_2$ or —O—PO(OH)$_2$ wherein the dye is in the free acid, alkali metal salt, ammonium or acid ammonium salt form.

2. The dye according to claim 1, wherein the definition of R is the same as the definition of R'.

3. The dye according to claim 1, wherein R and R' are in the same position, in that if R is in the meta position, then R' is in the meta position, and if R is in the para position, then R' is in the para position.

4. A dye of the formula:

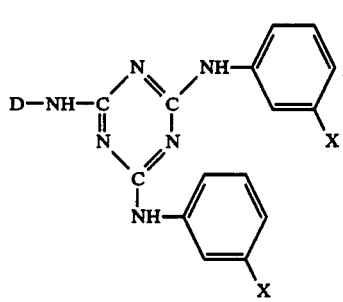

wherein:
D represents a chromophore, and
X is

8. A dye of the formula:

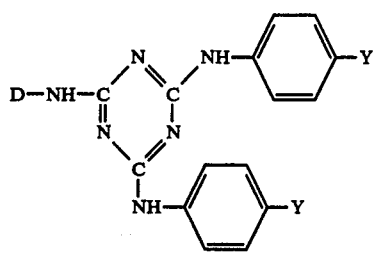

wherein:
D represents a chromophore and
Y is $$-O-\overset{O}{\underset{\|}{P}}(OH)_2.$$

9. The dye according to claim 8 of the formula:

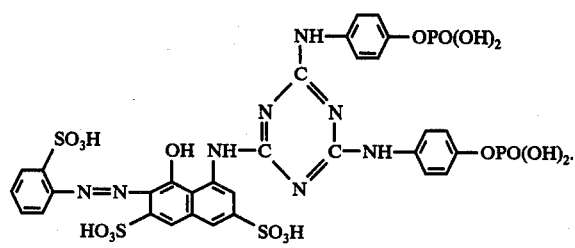
10. The dye according to claim 8 of the formula:
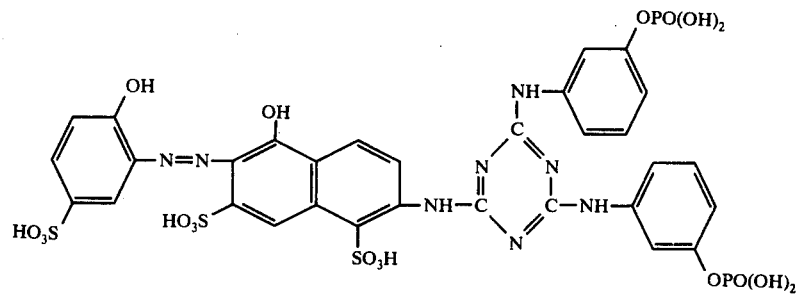
* * * * *